United States Patent
Komoriya et al.

(12)

(10) Patent No.: US 6,322,606 B1
(45) Date of Patent: Nov. 27, 2001

(54) COATED GRANULAR FERTILIZER AND METHOD FOR PRODUCING SAME

(75) Inventors: Haruhiko Komoriya, Saitama; Kazuhiko Maeda, Tokyo; Masayuki Shiota, Saitama; Yoshi Hirashima, Tokyo; Kentaro Tsutsumi, Saitama; Mikio Ootani, Saitama; Yukio Ikeda, Saitama, all of (JP)

(73) Assignee: Central Glass Company, Limited, Ube (JP)

(*) Notice: Subject to any disclaimer, the term of this patent is extended or adjusted under 35 U.S.C. 154(b) by 0 days.

(21) Appl. No.: 09/665,123

(22) Filed: Sep. 20, 2000

Related U.S. Application Data

(62) Division of application No. 09/048,111, filed on Mar. 26, 1998, now Pat. No. 6,176,891.

(30) Foreign Application Priority Data

Mar. 26, 1997 (JP) .......................................... 9-73230
Apr. 15, 1997 (JP) .......................................... 9-97622

(51) Int. Cl.⁷ ..................................................... C05G 5/00
(52) U.S. Cl. ........................... 71/11; 71/28; 71/34; 71/60; 71/61; 71/63; 71/64.07; 71/64.11
(58) Field of Search ............................... 71/64.07, 28, 11, 71/34, 60, 61, 63, 64.11

(56) References Cited

U.S. PATENT DOCUMENTS

| 4,272,377 | 6/1981 | Gerlach et al. . |
| 4,711,659 | * 12/1987 | Moore ....................................... 71/28 |
| 4,772,490 | 9/1988 | Koegler et al. . |
| 4,804,403 | * 2/1989 | Moore ....................................... 71/28 |
| 5,538,531 | * 7/1996 | Hudson et al. ........................... 71/28 |
| 5,679,129 | 10/1997 | Hon . |
| 5,698,002 | * 12/1997 | Hudson et al. ........................... 71/28 |
| 5,851,261 | * 12/1998 | Markusch et al. .................. 71/64.07 |

FOREIGN PATENT DOCUMENTS

| 380193 | 8/1990 | (EP) . |
| 1591081 | 6/1970 | (FR) . |
| 54-39298 | 11/1979 | (JP) . |
| 4-29410 | 5/1992 | (JP) . |
| 4-02078 | 7/1992 | (JP) . |
| 4-202079 | 7/1992 | (JP) . |
| 7-16648 | 3/1995 | (JP) . |
| 8-151286 | 6/1996 | (JP) . |

OTHER PUBLICATIONS

Derwent Database Abstract of JP 9–309785 A. (Abstract No. XP002111707). (No Date).
Derwent Database Abstract of JP 9–241090. (Abstract No. XP–002111708). (No Date).

* cited by examiner

Primary Examiner—Wayne Langel
(74) Attorney, Agent, or Firm—Crowell & Moring LLP

(57) ABSTRACT

The invention relates to a coated granular fertilizer having a film covering fertilizer granules. This film comprises a polyurethane resin prepared by a method comprising the steps of (a) reacting an aromatic polyisocyanate with a first polyol component (i.e., castor oil or a castor oil derivative), thereby to obtain a prepolymer having terminal isocyanate groups in the molecule; and (b) reacting the prepolymer with a second polyol component (i.e., castor oil or a castor oil derivative) and a third polyol component which is an amine having at least two hydroxyl groups in the molecule, thereby to cure the prepolymer and thus to prepare the polyurethane resin. The invention relates to another coated granular fertilizer having a film covering fertilizer granules. This film comprises a urethane resin and aqueous-fluid-absorbing particles having a particle diameter of from 1 to 200 μm. This urethane resin may be the above polyurethane resin. This coated granular fertilizer can be produced by a method comprising the steps of (a) applying an aromatic polyisocyanate, a polyol component (i.e., castor oil or a castor oil derivative), an amine, and the aqueous-fluid-absorbing particles, at the same time or separately in no special order, while the fertilizer granules are kept fluidized or rolled, thereby to form a precursory film on the fertilizer granules; and (b) curing the precursory film into the film. Each coated granular fertilizer is substantially superior in regulation of the release of plant nutrient elements therefrom.

28 Claims, No Drawings

COATED GRANULAR FERTILIZER AND METHOD FOR PRODUCING SAME

This application is a division of application Ser. No. 09/048,111, filed Mar. 26, 1998, U.S. Pat. No. 6,176,891.

BACKGROUND OF THE INVENTION

The present invention relates to a coated granular fertilizer that has a water-resistant film covering fertilizer granules, which is provided for regulating the release of plant nutrient elements therefrom, and a method for producing the coated granular fertilizer.

In recent years, there has been a demand for a fertilizer of which plant nutrient elements are effectively released therefrom, in order to reduce the effect of the leaching of plant nutrient elements on the environment and to save labor of aging farmers to apply fertilizers. In view of this, various delayed release fertilizers have been proposed and applied to practical is use. For example, there are coated granular fertilizers having an organic or inorganic film that covers fertilizer granules for regulating the release of plant nutrient elements therefrom. Majority of the coated granular fertilizers has an organic film made of resin or the like, due to its superiority in regulating the release of plant nutrient elements. In general, it is necessary to use an organic solvent in the production of coated granular fertilizers having such an organic film. Therefore, it is necessary to be careful, for example, about toxicity and inflammability of an organic solvent in the production of these coated granular fertilizers. If the organic solvent is not sufficiently removed from the obtained fertilizers, it causes an adverse effect on the environment. Furthermore, it is necessary to have many procedures and spend a lot of money to remove and recover the organic solvent.

In contrast, for example, Japanese Patent Examined Publication JP-B-4-29410 discloses a method for producing a coated granular fertilizer without using any organic solvent. In this method, fertilizer granules heated at a temperature of from 50 to 200° C. are coated with a copolymer of cyclopentadiene oligomer and an unsaturated fatty acid oil, which has been heated at a temperature of from 40 to 250° C. to melt the same. Then, the obtained coated film is dried and cured by an air heated at a temperature of from 40 to 200° C. (e.g., 150° C.).

JP-B-54-39298 discloses a method for producing a delayed release coated granular fertilizer. In this method, an isocyanato compound is reacted with a polyoxypropylene having a kinematic viscosity of not higher than 4,000 cps at 25° C. or a mixture of polyoxypropylenes, which has been adjusted to have a kinematic viscosity of not higher than 4,000 cps 25° C., thereby to form a polyurethane coated layer on fertilizer granules. It is further disclosed in this publication that according to need a petroleum resin is optionally formed on this polyurethane coated layer. In this publication, for example, nitrogen-containing polyoxypropylene compounds, such as an adduct of a polyoxypropylene and ethylene diamine, are cited as the above-mentioned polyoxypropylene JP-B-7-16648 discloses a method for forming a water-permeable film on a granular water-soluble substance. This method comprises the steps of (a) applying to the granular water-soluble substance a coating composition containing a polyisocyanate, a polyol component having a condensation product of phenol and aldehyde, a softener containing hydroxyl group, and optionally a thinner containing hydroxyl group; and (b) curing the coating composition with an amine used as a catalyst. In the second embodiment of this publication, a polyol component is prepared by mixing together 30 parts of a benzyl ether resin as the condensation product, 60 parts of castor oil as the softener and 10 parts of diacetone alcohol as the thinner. Then, the same weights of this polyol component and an industrial diphenylmethanediisocyanate-based polyisocyanate component are premixed together, and then this premix is applied to fertilizer granules, followed by curing using a nitrogen saturated with dimethylethylamine of 20° C. as a catalyst-gas mixture, thereby to produce a coated granular fertilizer.

Japanese Patent Unexamined Publication JP-A-4-202079 discloses a multilayer-coated granular fertilizer having a first layer formed on fertilizer granules and a second layer formed on the first layer. The. first layer is made of an aqueous-fluid-absorbing swelling substance, which can absorb a large amount of water to swell, such as an isobutylene polymer, a copolymer of acrylate and vinyl alcohol, a polyethyleneoxide modified resin, sodium acrylate polymer, a starch graft polymer, carboxymethyl cellulose (CMC), a metal salt of CMC, or bentonite. The second layer is made of an olefinic polymer, and particularly preferable examples of this olefinic polymer are copolymers of ethylene and acrylic ester, copolymers of ethylene and methacrylic ester, low-density polyethylene, copolymers of ethylene and propylene, and copolymers of ethylene and vinyl acetate. In order to allow the first layer to adhere to the fertilizer granules, it is disclosed therein to use an adhesive such as a copolymer of ethylene and vinyl acetate, a neopren-phenolic adhesive, polyethylene glycol, or a methacrylic ester adhesive.

JP-A-8-151286 discloses a multilayer-coated granular fertilizer having a first layer covering the surface of fertilizer granules and a second layer covering the first layer. The first layer is made of a wax, and the second layer is made of at least one of an alkyd resin (e.g., castor oil) and a substance that is soluble or swell in water. Examples of this substance are surfactants, glycols, their derivatives, polyolefin glycols and their derivatives, isobutylene polymers, copolymers of acrylate and vinyl alcohol, starch graft polymers, and starch. After the formation of the second layer, the wax of the first layer is melted or softened.

JP-A-4-202078 discloses a coated granular fertilizer having a first layer that is formed on the surface of fertilizer granules and made of an alkali substance and a second layer that is formed on the first layer and made of a mixture of an olefinic polymer and a polymer that is soluble in an alkali water.

Resin films of conventional coated fertilizers may remain in soil for a long time after elution of nutrient elements of fertilizer granules. This causes an adverse effect on the environment.

SUMMARY OF THE INVENTION

It is an object of the present invention to provide a coated granular fertilizer that is capable of regulating the release of plant nutrient elements therefrom by the provision of a homogeneous water-resistant film formed on fertilizer granules.

It is another object of the present invention to provide a coated granular fertilizer that is prepared by using a natural vegetable oil or fat as a raw material in view of its biodegradability, without using any organic solvent.

It is still another object of the present invention to provide a method for producing the coated granular fertilizer.

According to a first aspect of the present invention, there is provided a coated granular fertilizer comprising a fertilizer granule and a film covering the fertilizer granule This film comprises a polyurethane resin prepared by a method comprising the steps of (a) reacting an aromatic polyisocyanate with a first polyol component which is one of castor oil and a castor oil derivative, thereby to obtain a prepolymer having terminal isocyanate groups in the molecule; and (b) reacting the prepolymer with a second polyol component which is one of castor oil and a castor oil derivative and a third polyol component which is an amine having at least two hydroxyl groups in the molecule, thereby to cure the prepolymer and thus to prepare the polyurethane resin. The inventors have unexpectedly found that the obtained polyurethane resin film is substantially superior in regulation of the release of plant nutrient elements from the coated granular fertilizer. In fact, the coated granular fertilizer is superior in dissolution characteristic, water permeability characteristic, coated film strength, coated film softness, and the like.

According to the first aspect of the present invention, there is provided a method for producing the above-mentioned coated granular fertilizer. This method comprises the above-mentioned step (a) to obtain a prepolymer having terminal isocyanate groups in the molecule and the steps of (b) applying the prepolymer, a second polyol component which is one of castor oil and a castor oil derivative, and a third polyol component which is an amine having at least two hydroxyl groups in the molecule, at the same time or separately in no special order, while the fertilizer granule is kept fluidized or rolled, thereby to form a precursory film on the fertilizer granule; and (c) curing the precursory film into the polyurethane film.

According to a second aspect of the present invention, there is provided a coated granular fertilizer comprising a fertilizer granule and a first film covering the fertilizer granule. This first film comprises a urethane resin; and an aqueous-fluid-absorbing particle having a particle diameter of from 1 to 200 μm. This urethane resin may be the above-mentioned polyurethane resin of the present invention. The inventors have unexpectedly found that the coated granular fertilizer is substantially superior in regulation of the timing and rate of the release of plant nutrient elements from the coated granular fertilizer.

According to the second aspect of the present invention, there are provided first and second methods for producing the coated granular fertilizer. The first method comprises the steps of (a) applying an aromatic polyisocyanate, a polyol component which is one of castor oil and a castor oil derivative, an amine, and the aqueous-fluid-absorbing particle, at the same time or separately in no special order, while the fertilizer granule is kept fluidized or rolled, thereby to form a precursory film on the fertilizer granule; and (b) curing the precursory film into the first film. The second method comprises the above-mentioned step (a) to obtain a prepolymer having terminal isocyanate groups in the molecule; and the steps of (b) applying the prepolymer, a second polyol component which is one of castor oil and a castor oil derivative, an amine, and the aqueous-fluid-absorbing particle, at the same time or separately in no special order, while the fertilizer granule is kept fluidized or rolled, thereby to form a precursory film on the fertilizer granule; and (c) curing the precursory film into the first film.

DESCRIPTION OF THE PREFERRED EMBODIMENTS

A coated granular fertilizer according to the first aspect of the present invention will be described in detail, as follows.

As stated above, one of castor oil and a castor oil derivative is used as each of the first and second polyols. Examples of the castor oil derivative are partial hydrolysates of castor oil, a product of an ester interchange reaction of castor oil with a polyol selected from diols (such as ethylene glycol, propylene glycol, 1,4-butanediol, neopentyl glycol, 1,6-hexanediol, diethylene glycol, dipropylene glycol, polyethylene glycol, and polypropylene glycol), glycerol, trimethylolpropane, and polyether polyol, and esters formed by reactions between ricinoleic acid and the polyol selected from these compounds. Of these, it is preferable to use a product of an ester interchange reaction of castor oil with ethylene glycol or propylene glycol.

In the invention, one of castor oil and a castor oil derivative, which has a viscosity of not higher than 1,500 cps at 25° C., is preferably used as each of the first and second polyols, because it improves workability in the production of the coated granular fertilizer and homogeneousness of the coated film. Each of the first and second polyols has a preferable hydroxyl value of from 10 to 400 mg KOH/g. If it is less than 10 mg KOH/g, the coated film may become too high in adhesion. With this, the coated granular fertilizer may be formed into aggregates. If it is higher than 400 mg KOH/g, the coated film may have defects. With this, it may become difficult to regulate the release of plant nutrient elements therefrom. Basically, castor oil has an adequately high hydroxyl value of about 160 mg KOH/g and an adequate viscosity of about 700 cps, and thus it can preferably be used as each of the first and second polyols of the invention.

In the invention, examples of the aromatic polyisocyanate used for preparing the prepolymer having terminal isocyanate groups in the molecule are tolylene diisocyanate (TDI), diphenylmethane diisocyanate (MDI), naphthalene diisocyanate, polyphenylpolymethylene polyisocyanate, phenylene diisocyanate, xylylene diisocyanate, tetramethylxylene diisocyanate, and modified polyisocyanates of these, such as urea-type modified polyisocyanates, polyisocyanate dimers, polyisocyanate trimers, carbodiimide-type modified polyisocyanates, allophanate-type modified polyisocyanates, and biuret-type modified polyisocyanates. It is optional to use a mixture of at least two of these examples as the aromatic polyisocyanate. Furthermore, the aromatic polyisocyanate may be a so-called "crude" polyisocyanate for industrial use. In particular, the aromatic polyisocyanate is preferably selected from MDI, crude MDI (such as 4,4'-diphenylmethane diisocyanate), 2,2'-diphenylmethane diisocyanate and 2,4'-diphenylmethane diisocyanate), MDI dimer, MDI trimer, mixtures of these, carbodiimide-type MDI (MDI in the form of liquid), TDI, and crude TDI.

In the invention, the above-mentioned prepolymer may be prepared in accordance with a conventional method comprising the step of reacting an aromatic polyisocyanate with the first polyol component (castor oil or a castor oil derivative). This reaction may be conducted at a temperature of from 30 to 130° C., preferably of from 40 to 90° C., for 1–5 hr by adjusting the equivalent ratio of the isocyanate groups (O=C=N—) to the active hydrogen groups to fall within a range of from 1.1 to 50.0, preferably of from 1.2 to 25.0.

In the invention, the prepolymer may be a modified prepolymer. This modified prepolymer has a urethane bond and uretonimine and carbodiimide groups formed by modifying the prepolymer with a catalyst. The modified prepolymer may be prepared by a method comprising the steps of (a) reacting an aromatic polyisocyanate with the first polyol component in a manner to adjust the equivalent ratio of the isocyanate groups to the active hydrogen groups to fall within a range of at least 5.0, preferably 8–25, more preferably 10–20, and to adjust the amount of the first polyol component to be not higher than 15 mol %, preferably 2–15 mol %, more preferably 4–9 mol %, based on the total number of moles of the isocyanate groups, thereby to prepare a prepolymer; and (b) modifying this prepolymer with a catalyst. Examples of the aromatic polyisocyanate used for preparing the modified prepolymer are MDI (e.g., 4,4'-diphenylmethane diisocyanate, 2,2'-diphenylmethane diisocyanate, 2,4'-diphenylmethane diisocynate, and mixtures thereof) and polyphenylpolymethylene polyisocyanate. Examples of the catalyst used for preparing a MDI-modified prepolymer having uretonimine and carbodiimide groups are phosphorane catalysts such as 3-methyl-1-phenyl-3-phosphorane -1-oxide, 3-methyl- 1-ethyl-3-phosphorane-1-oxide, and 3-methyl-l-phenyl-2-phosphorane-l-oxide. This catalyst may be in an amount of from 1 to 300 ppm, based on the total weight of MDI.

The above-mentioned modified prepolymer may be prepared by the following first or second method. The first method comprises the sequential steps of (a) reacting a polyisocyanate with a polyol at a temperature of from 30 to 130° C., preferably of from 40 to 90° C., for a period of time of from 1 to 6 hr, thereby to obtain a prepolymer having terminal isocyanate groups in the molecule; (b) adding a catalyst to this prepolymer; (c) maintaining the resultant mixture at a temperature of from 30 to 130° C., preferably of from 60 to 90° C., for a period of time of from 3 to 5 hr, thereby to conduct the reaction to obtain the aimed amount of the remaining isocyanate groups; and (d) adding a deactivator to the mixture to terminate the reaction, thereby to obtain a modified prepolymer having uretone and carbodiimide groups. The second method for preparing a modified prepolymer comprises the sequential steps of (a) adding a polyol and a catalyst to a polyisocyanate; (b) maintaining the resultant mixture at a temperature of from 30 to 130° C., preferably of from 60 to 90° C., for a period of time of from 3 to 5 hr, thereby to conduct the reaction between the polyisocyanate and the polyol; and (c) adding a deactivator to the mixture to terminate the reaction, thereby to obtain a modified prepolymer having uretone and carbodiimide groups. Examples of the deactivator are trichlorosilane, dichlorodiphenylsilane, and trichloromonomethylsilane. The amount of the deactivator to terminate the reaction may be from 1 to 10 equivalents per equivalent of the catalyst.

In the production of the above-mentioned modified prepolymer, a carbodiimide group (N=C=N) is at first formed in the modified prepolymer by the addition of the catalyst. Then, this carbodiimide group changes into a uretonimine group by allowing the modified prepolymer to stand still for a certain period of time at normal temperature (e.g., room temperature). This change is a reversible reaction, and thus at a high temperature (normally at least 80° C.) the uretonimine group dissociates into a carbodiimide group and an isocyanate group. Thus, most of the carbodiimide groups change into uretonimine groups by standing still at normal temperature. In the invention, it is possible to use a first modified prepolymer in which the carbodimide groups have completely or incompletely changed into uretonimine groups, or a second modified prepolymer in which the uretonimine groups have completely or incompletely changed into carbodiimide groups by standing still at the above-mentioned high temperature. The total amount of the uretonimine and carbodiimide groups in a modified MDI as a modified prepolymer may be from 20 to 60 parts by weight, preferably from 30 to 50 parts by weight, per 100 parts by weight of MDI. The modified MDI is more compatible with other components than MDI is. Thus, the use of the modified MDI can bring about advantageous effects, such as the improvement of the reactivity with other components, the adjustment of the viscosity in a manner to improve workability, and the enhancement of adhesion of the coated film to the fertilizer granules.

In the invention, the third polyol component which is an amine having at least two hydroxyl groups in the molecule may be prepared by an addition reaction of an amine with an alkylene oxide (e.g., propylene oxide and ethylene oxide). This amine used in the addition reaction may be a low-molecular-weight amino polyol (such as diethanol amine, triethanol amine, and N-methyl-N,N-diethanol amine) or an amino compound such as ethylenediamine, 1,3-propanediamine, and 1,6-exanediamine). The ratio of the alkylene oxide to the amine in the addition reaction is not particularly limited. In fact, the number of the alkylene oxide may be from 1 to 200, preferably from 1 to 50, per one nitrogen atom of the amine. This number is particularly preferably from about 2.0 to 2.4, in order to adjust hydrophilicity of the coated film. Examples of the third polyol component are N,N,N',N'-tetrakis[2-hydroxypropyl] ethylenediamine, N,N,N', N'-tetrakis[2-hydroxyethyl] ethylenediamine, N,N,N',N'-tetrakis[2-hydroxypropyl]-1,3-propanediamine, N,N,N',N'-tetrakis[2-hydroxyethyl]-1,6-hexanediamine, N,N,N',N'-tetrakis[2-hydroxyethyl] ethylenediamine, N,N,N',N'-tetrakis[2-hydroxypropyl]-1,3-propanediamine, and N,N,N',N'-tetrakis[2-hydroxyethyl]-1, 6-hexanediamine. Particularly preferable examples of the third polyol component are N,N,N',N'-tetrakis[2-hydroxypropyl]ethylenediamine, N,N,N',N'-tetrakis[2-hydroxyethyl]ethylenediamine, and an oxypropylethylenediamine containing N,N,N',N'-tetrakis[2-hydroxypropyl] ethylenediamine as a major component thereof, and an oxyethylethylenediamine containing N,N,N',N'-tetrakis[2-hydroxyethyl]ethylenediamine as a major component thereof, because these examples are superior in reactivity and characteristics. The third polyol component is preferably used in the invention, because it becomes possible to obtain a good compatibility with the resin composition and to easily form a homogeneous film. Furthermore, the third polyol component accelerates the reaction and acts as a cross-linking agent and a chain-extending agent. Therefore, the prepolymer is well cured, and the coated film becomes strong. The amount of the third polyol component may be from 0.01 to 30 wt %, preferably from 0.1 to 20 wt %, more preferably from 1 to 15 wt %, based on the total weight of the urethane resin, in order to adjust the curing rate. If it is less than 0.01 wt %, the cure may become insufficient. This may impair the coated film's water-resistance and it's capability to adjust the release of plant nutrient elements therefrom. If it is greater than 30 wt %, the cross-linking rate may become too high. With this, it may become difficult to form a homogeneous film.

In the invention, it is optional to use an organic metal catalyst (e.g., dibutyltin laurate and lead octenate) in the preparation of the polyurethane resin, in order to accelerate the formation of urethane bond.

In the invention, the ratio of the number of hydroxyl groups to the number of isocyanate groups is preferably from 0.5 to 2.0 in the total of the prepolymer and the second and third polyol components. If it is less than 0.5 or greater than 2.0, the degree of cross-link of the coated film may become insufficient. With this, the release rate of plant nutrient elements may become too high. It is also preferable to adjust the ratio of the number of hydroxyl groups to the number of isocyanate groups to fall within a range from 1.1 to 1.5, in order that the unreacted isocyanate groups may not remain in the coated film and that the coated film may be provided with softness.

In the invention, the first or second polyol component (i.e., one of castor oil and a castor oil derivative) may be partially replaced with a vegetable fat or oil having in the molecule a conjugated double bond (e.g., conjugated diene, conjugated triene and conjugated tetraene) or a modified vegetable fat or oil having in the molecule such a conjugated double bond, in order to regulate the coated film in softness and strength by the additional cross-link formed by the conjugated double bond. Examples of the modified vegetable fat or oil are tung oil, dehydrated castor oil, conjugated soybean oil, conjugated linseed oil, hydrolysates of these oils, and products prepared by ester interchange reactions of carboxylic acid or an alcohol with these oils.

In the invention, the fertilizer granule to be coated with the film is not particularly limited. In fact, the fertilizer granule may be made of a fertilizer selected from urea, ammonium chloride, ammonium sulfate, ammonium nitrate, potassium chloride, potassium sulfate, potassium nitrate, sodium nitrate, potassium phosphate, ammonium phosphate, calcium phosphate, organic fertilizers, and mixtures thereof (complex fertilizers).

In the invention, the coated film is preferably in an amount of from 3 to 20 wt %, based on the total weight of the coated granular fertilizer. The release of plant nutrient elements may be adjusted depending on the thickness of the coated film.

In the invention, it is optional to add an organic or inorganic additive to the coating composition in the preparation of the film, in order to improve workability to apply the coating composition to the fertilizer granule and to assist in the regulation of the release of plant nutrient elements therefrom. Examples of this additive are alkyd resin, urethane resin, fatty acid ester, wax, rosin and its derivatives, ester gum, surfactant, petroleum resin, talc, diatomaceous earth, silica, bentonite, urea, starch, sodium polyacrylate, and sulfur powder. The 2 5 amount of the additive may be from 0.1 to 50 parts by weight per 100 parts by weight of the urethane resin. By selecting the type and the amount of the additive, it may be possible to regulate workability in the application of the coating composition to the fertilizer granule and the release of plant nutrient elements therefrom.

In the first aspect of the invention, the method for applying the coating composition to the fertilizer granule is not particularly limited. In fact, the coating composition (i.e., the prepolymer, the second and third polyol components) may be applied to the fertilizer granule at the same time or separately in no special order, while the fertilizer granule is kept fluidized or rolled, thereby to form a precursory film on the fertilizer granule. Then, this precursory film is cured into the polyurethane film, for example, by applying a heated air thereto.

It is optional to mix the second and third polyol components together, prior to the application of the coating composition to the fertilizer granule. Alternatively, it is optional to mix together the prepolymer and the second and third polyol components, prior to this application.

In the invention, the fertilizer granules can be fluidized, for example, by using a fluidized or spouted bed. Furthermore, it can be rolled, for example, by using a rolling pan or drum. In the invention, the coating composition may be applied to the fertilizer granules, for example, by spraying or dripping. For example, it may be sprayed onto the fertilizer granules by using a two fluid nozzle with compressed air. In the invention, the precursory film formed on the fertilizer granule may be cured at a temperature of from about room temperature (about 25° C.) to about 150° C., preferably by heating at a temperature of from about 40 to about 100° C. In fact, the heating temperature may suitably be selected, depending on the heating time, the amounts of the constituent components of the coating composition, and the fertilizer type of the fertilizer granules. If the fertilizer granule tends to be decomposed or deteriorated by heating, the heating temperature must be lowered. For example, urea is preferably heated at a temperature not higher than 90° C.

In the first aspect of the invention, it is optional to form on the polyurethane film at least one other film that is different from the polyurethane film in resin composition, the type and the amount of the additive, and the like, in order to nicely regulate the release of plant nutrient elements therefrom.

In the first aspect of the invention, it is assumed that the urethane structure of the polyurethane film becomes complicated due to the production of the polyurethane resin from the special prepolymer and that this urethane structure becomes more complicated due to the reaction of the prepolymer with a small amount of the third polyol component (i.e., an amine having at least two hydroxyl groups in the molecule). The inventors guess that the thus obtained complicated urethane structure brings about advantageous effects that the release of plant nutrient elements is low at the initial stage after the application of the coated granular fertilizer to soil and is suitably regulated after the initial stage. According to the first aspect of the invention, the polyurethane resin of the coated film is prepared by using a natural vegetable fat or oil (i.e., one of castor oil and a castor oil derivative) as a major material of the polyol component (i.e., the total of the first, second and third polyol components) for preparing the polyurethane resin. Therefore, the coated granular fertilizer can reduce an adverse effect on the environment, due to biodegradability of the polyurethane resin.

As stated above, a coated granular fertilizer according to the second aspect of the present invention comprises a fertilizer granule and at least one first film covering the fertilizer granule. This first film comprises a urethane resin and an aqueous-fluid-absorbing particle having a particle diameter of from 1 to 200 $\mu$m. This urethane resin may be the above-described polyurethane resin according to the first aspect of the invention. Thus, detailed descriptions related to this polyurethane will not be repeated in the following description.

In the second aspect of the invention, the polyol component used for preparing the urethane resin is not particularly limited. Examples of the polyol component are diols (such as ethylene glycol, propylene glycol, 1,4-butanediol, neopentyl glycol, 1,6-hexanediol, diethylene glycol, dipropylene glycol, polyethylene glycol, and polypropylene glycol), glycerol, trimethylolpropane, castor oil, castor oil derivatives, and adducts formed by addition reactions of these compounds with alkylene oxides (e.g., ethylene oxide and propylene oxide). Of these, it is particularly preferable to use castor oil or a castor oil derivative. Examples of the castor oil derivative are the same as above. Of these, it is preferable to use a product of an ester interchange reaction of castor oil with ethylene glycol or propylene glycol.

In the second aspect of the invention, an amine is used in the preparation of the urethane resin. This amine may be an alkylamine or an amine having at least two hydroxyl groups in the molecule. The latter amine is preferably used, and its explanation is as mentioned hereinabove. Examples of the former amine (i.e., alkylamine) are trimethylamine, triethylamine, dimethylethylamine and dimethylisopropylamine.

In the second aspect of the invention, the aqueous-fluid-absorbing particles are made of a special material that is capable of absorbing water in an amount such that the aqueous-fluid-absorbing particle which is in a dry condition will increase by a factor of at least 5 in volume by absorbing water. This special material is selected from water-soluble and water-insoluble materials. In particular, it is preferable to use a material that does not dissolve very much, but becomes a gel, when the material has absorbed water. An example of the special material is a special water-insoluble resin which has been designed to have a high water-absorbing capability by cross-linking a water-soluble resin into a water-insoluble resin. An example of this special water-insoluble resin is a cross-linked acrylate polymer that may be prepared by polymerizing sodium acrylate or the like together with a cross-linking agent or by cross-linking an acrylate polymer itself Examples of the cross-linked acrylate polymer are SUMIKAGEL S, L and R types (trade names) of SUMITOMO CHEMICAL CO., LTD., AQUAKEEP 10SH, 10SHP, 10SH-NF(20), SA60NTYPE2 (trade names) of Sumitomo Seika Chemicals Co., Ltd., AQUAMATE AQ-200 and AQ-200B-02 (trade names) of Sekisui Plastics Co., LTD., and SUNFRESH ST-500D and ST-500MPS (trade names) of SANYO CHEMICAL INDUSTRIES, LTD. Another example of the special water-insoluble resin is an isobutylene polymer, and examples of the isobutylene polymer, prepared by cross-linking a copolymer of polyisobutylene and maleic acid, are KI GEL-201K, KI GEL-201K-F2, KI GEL SOLUTION SYSTEM and KI GEL COMPOUND (trade names) of KURARAY CO., LTD. Other examples of the special water-insoluble resin are a copolymer prepared by copolymerizing an acrylate with a vinyl alcohol to form cross-link through hydrolysis, a resin modified with a polyethylene oxide, a starch graft polymer prepared by grafting acrylonitrile, acrylate or acrylic acid to starch, and a cellulose graft polymer by grafting acrylonitrile, an acrylate or acrylic acid to cellulose. Examples of the starch graft polymer are SUNFRESH ST-100, ST-500S AND ST-100MPS (trade names) of SANYO CHEMICAL INDUSTRIES, LTD. The special water-insoluble resin of the aqueous-fluid-absorbing particles is not limited at all to the above-mentioned examples, with respect to the production method, the types of monomers used in copolymerization, the cross-link manner, the type of the cross-link agent, and the like. Examples of water-soluble materials and other materials, which are usable as the material of the aqueous-fluid-absorbing particles, are starch (such as potato starch, corn starch, sweet potato starch, and water-soluble starch), carboxymethyl cellulose (CMC), a metal salt of CMC, and bentonite. Of the above-mentioned water-insoluble and water-soluble materials, it is particularly preferable to use an acrylate polymer, an isobutylene polymer, a starch graft polymer, or starch.

In the second aspect of the invention, the aqueous-fluid-absorbing particles have a particle diameter of from 1 to 200 $\mu$m, preferably from 5 to 100 $\mu$m, more preferably from 20 to 70 $\mu$m If it is less than 1 $\mu$m, there is no meaningful effect to regulate the timing and the rate of the release of plant nutrient elements from the coated granular fertilizer, as compared with a case in which the aqueous-fluid-absorbing particles have been omitted. If it is greater than 200 $\mu$m, it becomes difficult to produce a homogeneous urethane resin film. Furthermore, the urethane resin film tends to have defects.

In the second aspect of the invention, the amount of the aqueous-fluid-absorbing particles is changed, depending on its particle diameter, and it may be from 1 to 50 wt %, preferably from 2 to 20 wt %, more preferably from 3 to 15 wt %, based on the total weight of the urethane resin and the aqueous-fluid-absorbing particles. If it is less than 1 wt %, there is no meaningful effect to regulate the timing and the rate of the release of plant nutrient elements from the coated granular fertilizer, as compared with a case in which the aqueous-fluid-absorbing particles have been omitted. If it is greater than 50 wt %, it may become difficult to regulate the timing of the start of the release of plant nutrient elements therefrom, due to the increase of hydrophilicity of the coated film.

In the second aspect of the invention, the coated granular fertilizer may comprise at least one second film, in addition to the above-mentioned at least one first film. This second film is free of aqueous-fluid-absorbing particles and comprises a urethane resin which is the same as or different from the urethane resin of the first film. The exposed outermost layer of the coated granular fertilizer may be either the first or second film, but it is preferable to use the second film as the outermost layer. Furthermore, the innermost layer of the coated film of the coated granular fertilizer, which is directly formed on the fertilizer granule, may be either the first or second film.

In the second aspect of the invention, the total weight of all the coated film(s) may be from 1 to 30 wt %, preferably from 3 to 20 wt %, more preferably from 3 to 15 wt %, based on the total weight of the coated granular fertilizer, The release of plant nutrient elements may be adjusted depending on the thickness of the coated film(s).

In the second aspect of the invention, the method for applying the coating composition to the fertilizer granule is not particularly limited. In fact, the coating composition may be applied to the fertilizer granule at the same time or separately in no special order, while the fertilizer granule is kept fluidized or rolled, thereby to form a precursory film on the fertilizer granule. Then, this precursory film is cured into the polyurethane film, for example, by applying a heated air thereto. In the production of the coated granular fertilizer having at least two films covering a fertilizer granule, it is optional to use a fertilizer granule that has previously been coated with the second film. Furthermore, it is optional to form a urethane film on the first film of the coated granular fertilizer. As mentioned above, the coated granular fertilizer according to the second aspect of the invention may be produced by the first or second method. In the first method, the coated composition to be applied to the fertilizer granule is an aromatic polyisocyanate, the polyol component (i.e., castor oil or a castor oil derivative), an amine, and the aqueous-fluid-absorbing particles. In the second method, the coating composition is the prepolymer, the second polyol component (i.e., castor oil or a castor oil derivative), an amine, and the aqueous-fluid-absorbing particles. This amine in each of the first and second methods may be an alkylamine or an amine having at least two hydroxyl groups in the molecule. In the first method, at least two components selected from the above-mentioned four components may be mixed together, prior to the application of the coating composition thereto. In fact, the polyol component, the amine and the aqueous-fluid-absorbing particles may be mixed together, prior to the application of the same. In the second method, at least two components selected from the above-mentioned four components may be mixed together, prior to the application of the coating composition thereto. In fact, the second polyol component, the amine, and the aqueous-fluid-absorbing particles may be mixed together, prior to the application of the same.

According to the second aspect of the invention, the above-mentioned aqueous-fluid-absorbing particles are contained in the urethane resin which is superior in water resistance, mechanical strength and softness. This containment is assumed to bring about advantageous effects that the release of plant nutrient elements becomes low at the initial stage after the application of the coated granular fertilizer to soil and becomes suitably regulated after the initial stage. These advantageous effects may be enhanced by using the polyurethane resin of the first aspect of the invention as a urethane resin of the first film.

The following nonlimitative Examples 1–10 are illustrative of the first aspect of the present invention.

EXAMPLE 1

At first, a cylindrical fluidization vessel having a diameter of 10 cm was charged with 800 g of urea granules having an average particle diameter of 3.3 mm. Then, the urea granules were fluidized by blowing a heated air into the bottom of the vessel at a rate of 70 m$^3$/hr, and maintained at 80° C. under the fluidized condition. While the urea granules were fluidized, a mixture of 19.0 g of a castor oil (the second polyol component) having a hydroxyl value of 160 mg KOH/g and a viscosity of 700 cps at 25° C. and 3.5 g of an adduct (the third polyol component) of propylene oxide and ethylene diamine, which has a ratio of the number of propylene oxide to the number of nitrogen atoms of from 2.0 to 2.4 and a hydroxyl value of 760 mg KOH/g, was sprayed onto the urea granules from a two fluid nozzle by spending 1 hr, and at the same time 22.5 g of a MDI-modified castor oil (i.e., a prepolymer having terminal isocyanate groups in the molecule, prepared by mixing a castor oil (the first polyol component) with an excessive amount of MDI to adjust the weight of the isocyanate groups to 19 wt %, based on its total weight) was sprayed onto the urea granules from another nozzle by spending 1 hr.

After the spraying, the urea granules were further fluidized at 70° C. for 2 hr, thereby to form a film on the urea granules. Then, the coated urea granules were cooled down to room temperature. The coated film was in an amount of 5 wt %, based on the total weight of the coated granular fertilizer, as shown in Table 1. In each of Example 1 and the after-mentioned Examples 2–9, the ratio of the number of hydroxyl groups to the number of isocyanate groups was 1:1 in the total of the prepolymer and the second and third polyol components. In contrast, this ratio was 1.2:1 in the after-mentioned Example 10.

The obtained coated granular fertilizer was subjected to a nitrogen release test to evaluate the rate of nitrogen release therefrom. In this test, the coated granular fertilizer was put into water of a certain constant amount, and then it was allowed to stand still in a thermostat of 25° C. After an elapse of a certain period of time, the solution was separated from the coated granular fertilizer. Then, the amount of the released nitrogen in the solution was determined. The results are shown in Table 1.

TABLE 1

| | Amount of Film (wt %) | Nitrogen Release Rate into 25° C. water (%) | | | |
|---|---|---|---|---|---|
| | | 30 days | 50 days | 70 days | 90 days |
| Example 1 | 5 | 5 | 18 | 48 | 72 |
| Example 2 | 7 | 0 | 5 | 23 | 49 |
| Example 3 | 5 | 6 | 20 | 50 | 75 |
| Example 4 | 5 | 9 | 36 | 57 | 78 |
| Example 5 | 5 | 5 | 22 | 49 | 76 |
| Example 6 | 5 | 1 | 20 | 50 | 78 |
| Example 7 | 5 | 7 | 26 | 52 | 82 |
| Example 8 | 5 | 1 | 16 | 45 | 76 |
| Example 9 | 5 | 12 | 40 | 62 | 83 |
| Example 10 | 5 | 16 | 44 | 66 | 85 |

EXAMPLE 2

In this example, Example 1 was repeated except in that a combination of 26.6 g of the castor oil, 31.5 g of the MDI-modified castor oil, and 4.9 g of the adduct was used as the coating composition.

EXAMPLE 3

In this example, Example 1 was repeated except in that the fluidization vessel was replaced with a drum-type rolling device having a diameter of 30 cm to keep the urea granules rolled.

EXAMPLE 4

In this example, Example 1 was repeated except in that a combination of 18.5 g of the castor oil, 4.0 g of the adduct, and 22.5 g of a crude MDI-modified castor oil was used as the coating composition. This crude MDI-modified castor oil was a prepolymer having terminal isocyanate groups in the molecule, prepared by mixing a castor oil with an excessive amount of a crude MDI to adjust the weight of the isocyanate groups to 20 wt %, based on its total weight.

EXAMPLE 5

In this example, Example 1 was repeated except in that a combination of 6.7 g of the castor oil, 4.0 g of the adduct, and 34.8 g of a TDI-modified castor oil was used as the coating composition. This TDI-modified castor oil was a prepolymer having terminal isocyanate groups in the molecule, prepared by mixing a castor oil with an excessive amount of TDI to adjust the weight of the isocyanate groups to 8 wt %, based on its total weight.

EXAMPLE 6

In this example, Example 1 was repeated except in that a combination of 20.2 g of the castor oil, 22.5 g of the MDI-modified castor oil, and 2.2 g of triethanol amine was used as the coating composition.

EXAMPLE 7

In this example, Example 1 was repeated except in that a combination of 22.5 g of the MDI-modified castor oil, 3.5 g of the adduct, and 19.0 g of a castor oil derivative was used as the coating composition. This castor oil derivative having a hydroxyl value of 160 mg KOH/g and a viscosity of 220 cps at 25° C. was formed by an esterification between ethylene glycol and a hydrolysate of castor oil.

EXAMPLE 8

In this example, Example 1 was repeated except in that a mixture of 3.1 g of the adduct, 17.1 g of the castor oil, 4.5 g of a tung oil, and 0.05 g of manganese naphthenate was sprayed onto the urea granules from a nozzle, and at the same time 20.3 g of the MDI-modified castor oil was sprayed onto the urea granules from another nozzle.

EXAMPLE 9

In this example, Example 1 was repeated except in that a combination of 20.5 g of the castor oil, 2.0 g of the adduct, and 22.5 g of a carbodiimide-groups-containing MDI-modified castor oil was used as the coating composition. This MDI-modified castor oil was a prepolymer having terminal isocyanate groups in the molecule, prepared by mixing a castor oil with an excessive amount of a liquid MDI to adjust the weight of the isocyanate groups to 16 wt %, based on its total weight.

EXAMPLE 10

In this example, Example 1 was repeated except in that a combination of 20.6 g of the castor oil, 3.9 g of the adduct, and 20.5 g of the MDI-modified castor oil was used as the coating composition.

COMPARATIVE EXAMPLE 1

In this comparative example, a coating composition was applied to the fluidized urea granules in the same manner as that of Example 1. This coating composition was a combination of 17.5 g of a linseed oil having a hydroxyl value of mg KOH/g and a viscosity of 40 cps at 25° C., 22.5 g of the same MDI-modified castor oil as that of Example 1, and 5.0 g of triethanol amine. After the spraying, the urea granules were further fluidized at 70° C. for 2 hr and then cooled down to room temperature. With this, however, it was not possible to form a sufficiently cured film on the urea granules.

The following nonlimitative Examples 11–22 are illustrative of the second aspect of the present invention.

EXAMPLE 11

At first, a cylindrical fluidization vessel having a diameter of 10 cm was charged with 800 g of urea granules having an average particle diameter of 3.3 mm. Then, the urea granules were fluidized by blowing a heated air into the bottom of the vessel at a rate of 70 m$^3$/hr, and maintained at 80° C. under the fluidized condition. Separately, a dispersion was prepared by dispersing 9.3 g of aqueous-fluid-absorbing particles having an average particle diameter of 40 µm (i.e., a cross-linked polyacrylate that is called ST-500MPS (trade name) of SANYO CHEMICAL INDUSTRIES, LTD.) in 35.3 g of a castor oil having a hydroxyl value of 160 mg KOH/g and a viscosity of 700 cps at 25° C., using a stirrer. The particle diameter of the aqueous-fluid-absorbing particles ranges from to 50 µm in the catalogue of the same. While the urea granules were fluidized, a mixture of the total amount of the dispersion and 6.5 g of an adduct of propylene oxide and ethylene diamine, which has a ratio of the number of propylene oxide to the number of nitrogen atoms of from 2.0 to 2.4 and a hydroxyl value of 760 mg KOH/g, was sprayed onto the urea granules from a two fluid nozzle by spending 1 hr, and at the same time 41.9 g of a MDI-modified castor oil (i.e., a prepolymer having terminal isocyanate groups in the molecule, prepared by mixing a castor oil with an excessive amount of MDI to adjust the weight of the isocyanate groups to 19 wt %, based on its total weight) was sprayed onto the urea granules from another nozzle by spending 1 hr. After the spraying, the urea granules were further fluidized at 70° C. for 2 hr, thereby to form a film on the urea granules. Then, the coated urea granules were cooled down to room temperature. The coated film was in an amount of 10 wt %, based on the total weight of the coated granular fertilizer, as shown in Table 2.

The obtained coated granular fertilizer was subjected to a nitrogen release test to evaluate the rate of nitrogen release therefrom. In this test, the coated granular fertilizer was put into water of a certain amount, and then it was allowed to stand still in a thermostat of 25° C. After an elapse of a certain period of time, the solution was separated from the coated granular fertilizer. Then, the amount of the released nitrogen in the solution was determined. The results are shown in Table 2.

TABLE 2

| | Amount of Film(s) (wt %) | Nitrogen Release Rate into 25° C. water % | | | | |
|---|---|---|---|---|---|---|
| | | 30 days | 50 days | 70 days | 90 days | 110 days |
| Ex. 11 | 10 | 20 | 61 | 82 | 93 | 95 |
| Ex. 12 | 10 | 3 | 20 | 43 | 69 | 90 |
| Ex. 13 | 10 | 14 | 58 | 79 | 92 | 95 |
| Ex. 14 | 10 | 0 | 3 | 19 | 48 | 73 |
| Ex. 15 | 10 | 1 | 16 | 50 | 69 | 85 |
| Ex. 16 | 10 | 2 | 9 | 40 | 67 | 89 |
| Ex. 17 | 10 | 1 | 5 | 23 | 55 | 80 |
| Ex. 18 | 10 | 1 | 18 | 42 | 67 | 88 |
| Ex. 19 | 10 | 4 | 24 | 45 | 71 | 91 |
| Ex. 20 | 10 | 18 | 58 | 81 | 92 | 95 |
| Ex. 21 | 10 (5 + 5) | 1 | 8 | 37 | 68 | 93 |
| Ex. 22 | 10 (5 + 5) | 3 | 9 | 39 | 68 | 95 |
| Com. Ex. 2 | 10 | 0 | 0 | 1 | 11 | 29 |
| Com. Ex. 3 | 5 | 5 | 18 | 48 | 72 | 79 |
| Com. Ex. 4 | 10 | 86 | 90 | 94 | 97 | 78 |

EXAMPLE 12

In this example, Example 11 was slightly modified, as follows. A dispersion was prepared by dispersing 4.7 g of the aqueous-fluid-absorbing particles (ST-500MPS) in 37.3 g of the castor oil. Then, while the urea granules were fluidized, the total amount of this dispersion, 44.1 g of the MDI-modified castor oil, and 6.9 g of the adduct were applied to the urea granules in the same manner as that of Example 11.

EXAMPLE 13

In this example, Example 12 was repeated except in that the aqueous-fluid-absorbing particles (ST-500MPS) were replaced with 4.7 g of aqueous-fluid-absorbing particles having an average particle diameter of 60 µm (20–30 µm in the catalogue), that is, a cross-linked polyacrylate which is called AQUAKEEP 10SH-NF (trade name) of Sumitomo Seika Chemicals Co., Ltd.

EXAMPLE 14

In this example, Example 12 was repeated except in that the aqueous-fluid-absorbing particles (ST-500MPS) were replaced with 4.7 g of aqueous-fluid-absorbing particles having an average particle diameter of 17 µm (not greater than 17 µm in the catalogue), that is, a cross-linked polyacrylate which is called AQUARIC CA-ML10 (trade name) of NIPPON SHOKUBAI Co., Ltd.

EXAMPLE 15

In this example, Example 11 was repeated except in that the aqueous-fluid-absorbing particles (ST-500MPS) were replaced with 9.3 g of potato starch particles hating an average particle diameter of 70 μm (10–90 μm according to published data).

EXAMPLE 16

In this example, Example 12 was repeated except in that the aqueous-fluid-absorbing particles (ST-500MPS) were replaced with 4.7 g of starch graft polymer particles having an average particle diameter of 40 μm (20–50 μm in the catalogue), prepared by grafting acrylate to starch, that is, ST-100MPS (trade name) of SANYO CHEMICAL INDUSTRIES, LTD.

EXAMPLE 17

In this example, Example 12 was repeated except in that the aqueous-fluid-absorbing particles (ST-500MPS) were replaced with 4.7 g of isobutylene polymer particles having an average particle diameter of 20 μm (smaller than 200-mesh in the catalogue), prepared by cross-linking a copolymer of polyisobutylene and maleic anhydride, that is, KI GEL-201K-F2 (trade name) of KURARAY CO., LTD.

EXAMPLE 18

In this example, Example 12 was slightly modified as follows. That is, a dispersion was prepared by dispersing 4.7 g of the aqueous-fluid-absorbing particles (ST-500MPS) in 64.0 g of the castor oil, using a stirrer. Then, while the urea granules were fluidized, the total amount of this dispersion, 22.0 g of a crude MDI, and 1.0 g of triethanol amine were applied to the urea granules.

EXAMPLE 19

In this example, Example 12 was repeated except in that the castor oil (37.3 g) was replaced with 37.3 g of a castor oil derivative. This castor oil derivative, having a hydroxyl value of 160 mg KOH/g and a viscosity of 220 cps at 25° C., was formed by an esterification between ethylene glycol and a hydrolysate of castor oil.

EXAMPLE 20

In this example, Example 11 was repeated except in that the fluidization vessel was replaced with a drum-type rolling device having a diameter of 30 cm to keep the urea granules rolled.

EXAMPLE 21

In this example, a coated granular fertilizer having first and second films on fertilizer granules was produced as follows. At first, urea granules in an amount of 800 g having an average particle diameter of 3.3 mm were fluidized in the same manner as that of Example 11 and maintained at 80° C. under the fluidized condition. Separately, a dispersion was prepared by dispersing 2.4 g of the same aqueous-fluid-absorbing particles (ST-500MPS) as those of Example 11 in 18.6 g of the same castor oil as that of Example 11, using a stirrer. While the urea granules were fluidized, a mixture of the total amount of the dispersion and 3.5 g of the same adduct of propylene oxide and ethylene diamine as that of Example 11 was sprayed onto the urea granules from a two fluid nozzle by spending 1 hr, and at the same time 22.0 g of the same MDI-modified castor oil as that of Example 11 was sprayed onto the urea granules from another nozzle by spending 1 hr, thereby to form on the urea granules a first film containing the aqueous-fluid-absorbing particles.

Then, while the coated urea granules were fluidized, a mixture of 19.6 g of the same castor oil as that of Example 11 and 3.6 g of the same adduct of propylene oxide and ethylene diamine as that of Example 11 was sprayed onto the coated urea granules from a two fluid nozzle by spending 1 hr, and at the same time 23.3 g of the same MDI-modified castor oil as that of Example 11 was sprayed onto the coated urea granules from another nozzle by spending 1 hr. After the spraying, the coated urea granules were further fluidized for 2 hr at 70° C., thereby to form on the first film a second film which is free of aqueous-fluid-absorbing particles. Then, the obtained coated granular fertilizer was cooled down to room temperature. Each of the first and second films was in an amount of 5 wt %, based on the total weight of the coated granular fertilizer, as shown in Table 2.

The obtained coated granular fertilizer was subjected to the same nitrogen release test as that of Example 11. The results are shown in Table 2.

EXAMPLE 22

In this example, a coated granular fertilizer having first and second films on fertilizer granules was produced as follows. At first, urea granules in an amount of 800 g having an average particle diameter of 3.3 mm were fluidized in the same manner as that of Example 11 and maintained at 80° C. under the fluidized condition. Separately, a dispersion was prepared by dispersing 2.4 g of the same aqueous-fluid-absorbing particles (ST-500MPS) as those of Example 11 in 18.1 g of the same castor oil as that of Example 11, using a stirrer. While the urea granules were fluidized, a mixture of the total amount of the dispersion and 3.9 g of the same adduct of propylene oxide and ethylene diamine as that of Example 11 was sprayed onto the urea granules from a two fluid nozzle by spending 1 hr, and at the same time 22.1 g of a crude MDI-modified castor oil (i.e., a prepolymer having terminal isocyanate groups in the molecule, prepared by mixing a castor oil with an excessive amount of MDI to adjust the weight of the isocyanate groups to 20 wt %, based on its total weight) was sprayed onto the urea granules from another nozzle by spending 1 hr, thereby to form on the urea granules a first film containing the aqueous-fluid-absorbing particles.

Then, while the coated urea granules were fluidized, a mixture of 19.0 g of the same castor oil as that of Example 11 and 4.1 g of the same adduct of propylene oxide and ethylene diamine as that of Example 11 was sprayed onto the coated urea granules from a two fluid nozzle by spending 1 hr, and at the same time 23.4 g of the same MDI-modified castor oil as above was sprayed onto the coated urea granules from another nozzle by spending 1 hr. After the spraying, the coated urea granules were further fluidized for 2 hr at 70° C., thereby to form on the first film a second film which is free of aqueous-fluid-absorbing particles. Then, the obtained coated granular fertilizer was cooled down to room temperature. Each of the first and second films was in an amount of 5 wt %, based on the total weight of the coated granular fertilizer, as shown in Table 2.

The obtained coated granular fertilizer was subjected to the same nitrogen release test as that of Example 11. The results are shown in Table 2.

COMPARATIVE EXAMPLE 2

In this comparative example, Example 11 was repeated except in that the aqueous-fluid-absorbing particles were omitted from the coating composition.

COMPARATIVE EXAMPLE 3

In this comparative example, Example 11 was repeated except in that the aqueous-fluid-absorbing particles were omitted from the coating composition and that the coating composition was sprayed on to the urea granules such that the film was in an amount of 5 wt %, based on the total weight of the coated granular fertilizer.

COMPARATIVE EXAMPLE 4

In this comparative example, Example 12 was repeated except in that the aqueous-fluid-absorbing particles (ST-500MPS) were replaced with 4.7 g of aqueous-fluid-absorbing particles having an average particle diameter of 380 µm (200–300 µm in the catalogue), that is, a cross-linked polyacrylate which is called AQUAKEEP 10SH (trade name) of Sumitomo Seika Chemicals Co., Ltd.

The entire disclosure of each of Japanese Patent Application Nos. 9-73230 filed on Mar. 26, 1997 and 9-97622 filed on Apr. 15, 1997, including specification, claims, and summary, is incorporated herein by reference in its entirety.

What is claimed is:

1. A coated granular fertilizer comprising a fertilizer granule and at least one first film covering said fertilizer granule, said first film comprising:
   a urethane resin; and
   an aqueous-fluid-absorbing particle having a particle diameter of from 1 to 200 µm and capable of absorbing water in an amount such that said aqueous-fluid-absorbing particle which is in a dry condition will increase by a factor of at least 5 in volume by absorbing water.

2. A fertilizer according to claim 1, further comprising at least one second film, said second film being free of an aqueous-fluid-absorbing particle and comprising a urethane resin which is the same as or different from said urethane resin of said first film.

3. A fertilizer according to claim 2, wherein an outermost layer of said fertilizer is said first film.

4. A fertilizer according to claim 2, wherein an outermost layer of said fertilizer is said second film.

5. A fertilizer according to claim 2, wherein an innermost layer of said fertilizer, which is directly formed on said fertilizer granule, is said first film.

6. A fertilizer according to claim 2, wherein an innermost layer of said fertilizer, which is directly formed on said fertilizer granule, is said second film.

7. A fertilizer according to claim 1, wherein said urethane resin is a polyurethane resin prepared by a method comprising the step of reacting an aromatic polyisocyanate with a polyol component, which is one of castor oil and a castor oil derivative, and an amine.

8. A fertilizer according to claim 7, wherein said amine is one of an alkylamine and an amine having at least two hydroxyl groups in the molecule.

9. A fertilizer according to claim 1, wherein said urethane resin is a polyurethane resin prepared by a method comprising the steps of:
   (a) reacting an aromatic polyisocyanate with a first polyol component selected from the group consisting of castor oil and a castor oil derivative, thereby obtaining a prepolymer having terminal isocyanate groups in the molecule; and
   (b) reacting said prepolymer with a second polyol component selected from the group consisting of castor oil and a castor oil derivative and a third polyol component which is an amine having at least two hydroxyl groups in the molecule, thereby curing said prepolymer and thus preparing said polyurethane resin.

10. A fertilizer according to claim 1, wherein said aqueous-fluid-absorbing particle is made of a material selected from the group consisting of cross-linked metal polyacrylates, cross-linked isobutylene polymers, starch graft polymers, and starch.

11. A fertilizer according to claim 1, wherein said aqueous-fluid-absorbing particle is in an amount of from 1 to 50 wt %, based on the total weight of said aqueous-fluid-absorbing particle and said urethane resin.

12. A fertilizer according to claim 1, wherein said fertilizer granule is made of a fertilizer selected from the group consisting of urea, ammonium chloride, ammonium sulfate, ammonium nitrate, potassium chloride, potassium sulfate, potassium nitrate, sodium nitrate, potassium phosphate, ammonium phosphate, calcium phosphate, organic fertilizers, and mixtures thereof.

13. A fertilizer according to claim 1, wherein said aqueous-fluid-absorbing particle is made of an organic material.

14. A fertilizer according to claim 13, wherein said organic material is a water-insoluble resin.

15. A fertilizer according to claim 1, wherein said aqueous-fluid-absorbing particle is made of a material such that said material becomes a gel by absorbing water.

16. A method for producing a coated granular fertilizer, said method comprising the steps of:
   (a) applying an aromatic polyisocyanate, a polyol component selected from the group consisting of castor oil and a castor oil derivative, an amine, and an aqueous-fluid-absorbing particle having a particle diameter of from 1 to 200 µm, at the same time or separately in no special order, to a fertilizer granule that is kept fluidized or rolled, thereby to form a precursory film on said fertilizer granule; and
   (b) curing said precursory film into a first film comprising a urethane resin and said aqueous-fluid-absorbing particle,
   wherein said aqueous-fluid-absorbing particle is capable of absorbing water such that said aqueous-fluid-absorbing particle in a dry condition will increase by a factor of at least 5 in volume by absorbing water.

17. A method according to claim 16, wherein at least two components selected from the group consisting of said aromatic polyisocyanate, said polyol component, said amine, and said aqueous-fluid-absorbing particle are mixed together, prior to the step (a).

18. A method according to claim 16, wherein said polyol component, said amine, and said aqueous-fluid-absorbing particle are mixed together, prior to the step (a).

19. A method according to claim 16, wherein said amine is one of an alkylamine and an amine having at least two hydroxyl groups in the molecule.

20. A method according to claim 16, wherein said fertilizer granule has a second film that has been formed on the fertilizer granule, prior to the step (a), so that said first film is formed on said second film, said second film being free of an aqueous-fluid-absorbing particle and comprising a urethane resin which is the same as or different from said urethane resin of said first film.

21. A method according to claim 16, further comprising the step of forming a urethane film on said first film.

22. A method for producing a coated granular fertilizer, said method comprising the steps of:

(a) reacting an aromatic polyisocyanate with a first polyol component selected from the group consisting of castor oil and a castor oil derivative, thereby to obtain a prepolymer having terminal isocyanate groups in the molecule;

(b) applying said prepolymer, a second polyol component selected from the group consisting of castor oil and a castor oil derivative, an amine, and an aqueous-fluid-absorbing particle having a particle diameter of from 1 to 200 μm, at the same time or separately in no special order, to a fertilizer granule that is kept fluidized or rolled, thereby to form a precursory film on said fertilizer granule; and (c) curing said precursory film into a first film comprising a urethane resin and an aqueous-fluid-absorbing particle.

23. A method according to claim 22, wherein at least two components selected from the group consisting of said prepolymer, said second polyol component, said amine, and said aqueous-fluid-absorbing particle are mixed together, prior to the step (b).

24. A method according to claim 22, wherein said second polyol component, said amine, and said aqueous-fluid-absorbing particle are mixed together, prior to the step (b).

25. A method according to claim 22, wherein said amine is one of an alkylamine and an amine having at least two hydroxyl groups in the molecule.

26. A method according to claim 22, wherein said fertilizer granule has a second film that has been formed on the fertilizer granule, prior to the step (a), so that said first film is formed on said second film, said second film being free of an aqueous-fluid-absorbing particle and comprising a urethane resin which is the same as or different from said urethane resin of said first film.

27. A method according to claim 22, further comprising the step of forming a urethane film on said first film.

28. A method according to claim 22, wherein said aqueous-fluid-absorbing particle is capable of absorbing water in an amount such that said aqueous-fluid-absorbing particle which is in a dry condition will increase by a factor of at least 5 in volume by absorbing water.

* * * * *